(12) United States Patent
Backes et al.

(10) Patent No.: US 6,276,310 B1
(45) Date of Patent: Aug. 21, 2001

(54) FUEL ADDITIVE DOSING METHOD AND SYSTEM FOR ONBOARD VEHICLE USE

(75) Inventors: Rolf Backes, Stolberg (DE); Sarah Jane Gadd, Rishworth (GB)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/479,533

(22) Filed: Jan. 7, 2000

(51) Int. Cl.[7] .................................................. F02B 75/00
(52) U.S. Cl. ............................................................ 123/1 A
(58) Field of Search ..................................... 123/1 A, 446, 123/495, 515, 498 A

(56) References Cited

U.S. PATENT DOCUMENTS

| | | | |
|---|---|---|---|
| 4,253,436 | * | 3/1981 | Dudrey .............................. 123/198 A |
| 4,329,945 | * | 5/1982 | Beech et al. ........................ 123/25 B |
| 4,568,248 | * | 2/1986 | Harders ................................... 417/43 |
| 4,596,277 | | 6/1986 | Djordjevic . |
| 4,621,593 | | 11/1986 | Rao et al. . |
| 4,727,827 | * | 3/1988 | Hoffman et al. ..................... 123/1 A |
| 5,195,466 | | 3/1993 | Schulte et al. . |
| 5,331,994 | | 7/1994 | Bryan, III et al. . |
| 5,421,295 | | 6/1995 | Lemaire et al. . |
| 5,441,072 | * | 8/1995 | Indey et al. ...................... 137/101.21 |
| 5,542,394 | | 8/1996 | Tomisawa . |
| 5,758,496 | | 6/1998 | Rao et al. . |
| 6,068,672 | * | 5/2000 | Watson et al. ......................... 44/629 |

\* cited by examiner

*Primary Examiner*—Noah P. Kamen
*Assistant Examiner*—Hai Huynh
(74) *Attorney, Agent, or Firm*—Jerome R. Drouillard

(57) ABSTRACT

A fuel additive dosing method and system for adding additive to fuel in a vehicle monitors the fuel added into the fuel tank of the vehicle by using an onboard flow measuring device such as a turbine, a venturi, a rotary meter, or a thermal flow meter located at the inlet of the fuel tank. The fuel added into the fuel tank may also be monitored by receiving a signal indicative of the fuel added into the fuel tank from a fuel pump pumping the fuel into the fuel tank to the vehicle. The method and system use an electronic control unit (ECU) of the vehicle to monitor fuel consumption. The direct approaches for monitoring the fuel added to the vehicle in conjunction with monitoring fuel consumption enables the method and system to add a proper amount of additive to the fuel to maintain a desired fuel/additive ratio in the vehicle.

6 Claims, 2 Drawing Sheets

FUEL ADDITIVE DOSING METHOD AND SYSTEM FOR ONBOARD VEHICLE USE

TECHNICAL FIELD

The present invention generally relates to fuel additive dosing methods and systems for adding additives to fuel in a vehicle and, more particularly, to a method and system for adding an additive to fuel by directly monitoring the fuel added to a vehicle in conjunction with using the vehicle electronic control unit to monitor fuel consumption and fuel remaining in the fuel tank.

BACKGROUND ART

Vehicles having combustion engines can employ filters for collecting particulate emitted from the engines. Engine particulate collected by a filter causes the exhaust back pressure to increase, adversely affecting fuel economy and vehicle performance. A regeneration method is required for successful operation of the engine particulate filters.

One way to regenerate a particulate filter is to oxidize the collected particulate. A problem with this approach is that the oxidation temperature of the collected particulate (carbon) lies above the temperature range of the exhaust of most vehicles having combustion engines. Some form of external energy is used to increase the filter temperature such that the oxidation temperature is reached and the filter can regenerate. Electrical heaters and fuel burners are two such external energy systems, but are not viable for vehicles due to increased cost, complexity, and reliability.

Another way to regenerate a particulate filter is to use a catalyst to lower the oxidation temperature of the collected particulate. Catalysts can either be applied as a filter coating or as an additive added to the fuel of the vehicle. The advantage of fuel additives to promote regeneration is that the catalyst is contained within the particulate trapped by the filter. A fuel additive dosing system adds the additive to the fuel.

The fuel additive dosing system must add a determined amount of the additive to the fuel to maintain a desired fuel/additive ratio. Typical fuel additive dosing systems use the fuel level sender gauge located in the fuel tank to monitor the fuel level in the fuel tank. The typical fuel additive dosing systems gain information about the refueling operations such as the amount of fuel added during refueling by using the fuel level gauge.

A problem with using the fuel level gauge in the fuel tank is that the reading from the fuel level gauge is typically not accurate enough for fuel additive dosing systems. Fuel level gauges are also prone to having erroneous fuel readings when the fuel tank is full or nearly empty.

Because the fuel level reading regarding the amount of fuel in the fuel tank is not typically accurate, the fuel additive dosing systems add an improper amount of the additive to the fuel. The improper amount may be more or less than the amount required for maintaining the desired fuel/additive mixture ratio. This causes the actual fuel/additive ratio to be different than the desired fuel/additive ratio. Deviance from the desired fuel/additive ratio must be kept to a minimum for proper filter performance.

What is needed is a more accurate way of determining the amount of fuel in a vehicle or added to a vehicle for fuel additive dosing methods and systems.

DISCLOSURE OF INVENTION

It is an object of the present invention to provide a method and system for adding an additive to fuel based on directly monitoring the fuel added to a vehicle having an engine in conjunction with using the engine electronic control unit for monitoring fuel consumption and fuel remaining in the fuel tank.

Accordingly, the present invention provides a method for adding an additive to fuel in a vehicle having an electronic control unit. The method includes monitoring the amount of fuel consumed by the vehicle prior to refueling using the electronic control unit (ECU). The amount of fuel added to the vehicle during refueling is measured during refueling. The amount of fuel in the vehicle after refueling is then determined as a function of the amount of fuel consumed by the vehicle prior to refueling and the amount of fuel added to the vehicle during refueling. The amount of the additive to add to the fuel in the vehicle to maintain a desired fuel/additive ratio is then determined as a function of the amount of fuel added to the vehicle. The determined amount of the additive is then added to the fuel in the vehicle.

Further according to the present invention, there is provided a system for adding an additive to fuel in a vehicle having a fuel tank. The system includes an electronic control unit for monitoring the amount of fuel consumed by the vehicle prior to refueling. Measuring means measure the amount of fuel added to the fuel tank of the vehicle during refueling. A processor operable with the ECU, or as part of the ECU, and the measuring means determines the amount of fuel in the fuel tank after refueling as a function of the amount of fuel consumed by the vehicle prior to refueling and the amount of fuel added to the fuel tank during refueling. The processor determines an amount of the additive to add to the fuel tank as a function of the determined amount of fuel added to the fuel tank to maintain a desired fuel/additive ratio.

Preferably, the system further includes a dispenser for adding the determined amount of the additive to the fuel tank of the vehicle. In alternative embodiments of the present invention, the measuring means include a receiver for receiving a signal from a fuel pump indicative of the amount of fuel added to the fuel tank during refueling, or a venturi or turbine positioned between the fuel tank and the fuel tank opening, for measuring the flow of fuel added to fuel tank during refueling.

BRIEF DESCRIPTION OF DRAWINGS

The present invention will now be described in further detail, and by way of example, with reference to the accompanying drawings, in which.

BEST MODE FOR CARRYING OUT THE INVENTION

Figure 1:
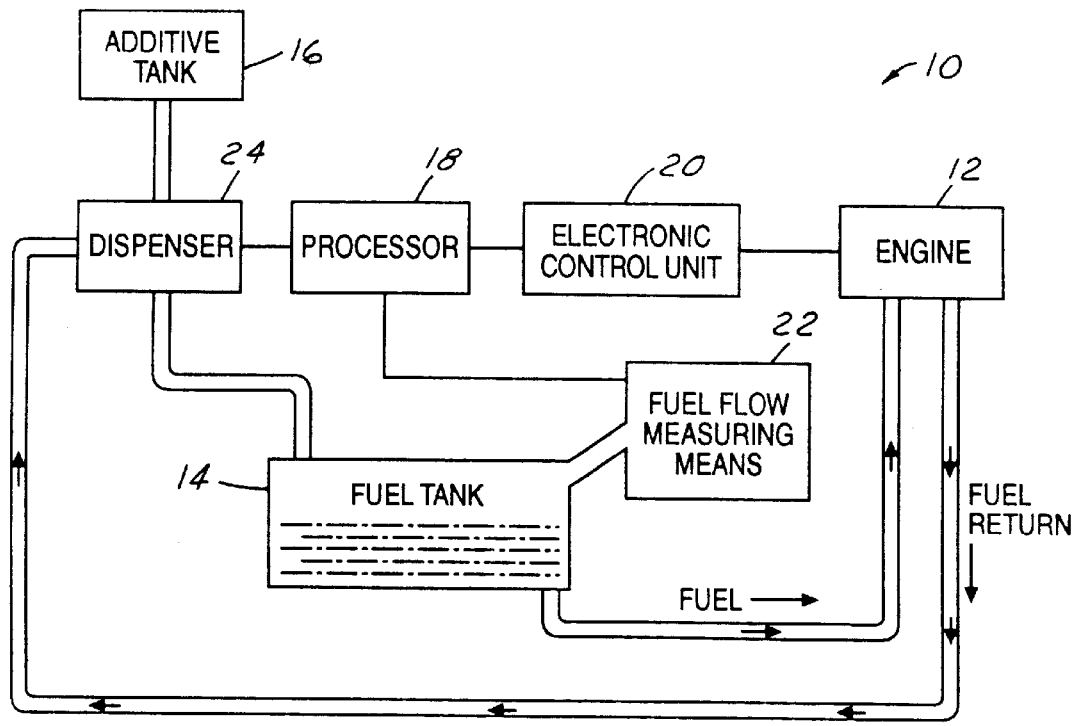
FIG. 1 illustrates a fuel additive dosing system for a vehicle in accordance with the present invention.

Referring now to FIG. 1, a block diagram of a fuel additive dosing system 10 in accordance with the present invention is shown. Fuel additive dosing system 10 adds an additive to fuel in a vehicle having a combustion engine 12, a fuel tank 14, and a fuel additive tank 16. System 10 includes a processor 18, an engine electronic control unit (ECU) 20, fuel added measuring means 22, and an additive dispenser 24.

ECU 20 is operable with engine 12 for monitoring the amount of fuel consumed by the engine. ECU 20 calculates the fuel needed for each injection into the cylinders of the engine on a stroke by stroke basis. ECU 20 uses the information regarding the fuel required for each injection into each cylinder to provide an indication of the amount of fuel consumed by the vehicle over any given period of time prior to refueling. ECU 20 also uses the information to provide an indication of the amount of fuel remaining in the vehicle.

Figure 2:
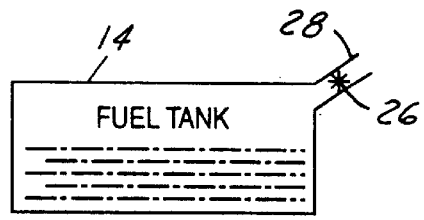
FIG. 2 illustrates a turbine used as an onboard flow measuring device for measuring fuel added to the vehicle.
Figure 3:
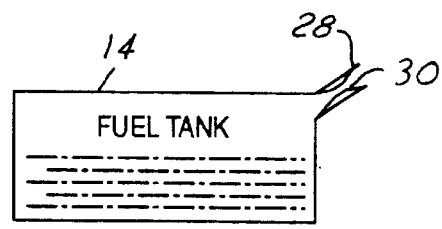
FIG. 3 illustrates a venturi used as an onboard flow measuring device for measuring fuel added to the vehicle.

Measuring means 22 directly measure the amount of fuel added to fuel tank 14 during refueling. Measuring means 22 may be an onboard flow measuring device such as a turbine 26 located at the inlet 28 of fuel tank 14 as shown in FIG. 2, an onboard flow measuring device such as a venturi 30 located at the inlet of the fuel tank as shown in FIG. 3, a rotary meter, or a thermal flow meter. Unlike prior art fuel level gauges located in the fuel tank of a vehicle, turbine 26 and venturi 30 directly monitor the fuel added to a vehicle to provide a more accurate indication of the fuel in and added into the vehicle.

Figure 4:
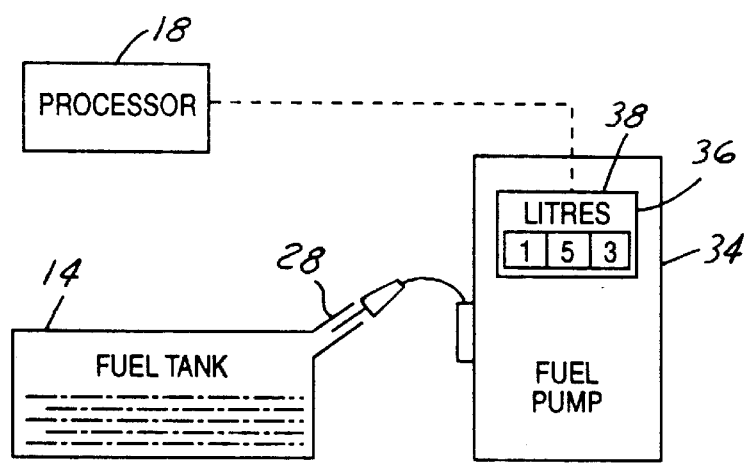
FIG. 4 illustrates a fuel pump capable of transmitting a signal to the vehicle indicative of the amount of fuel added to the vehicle.
Figure 5:
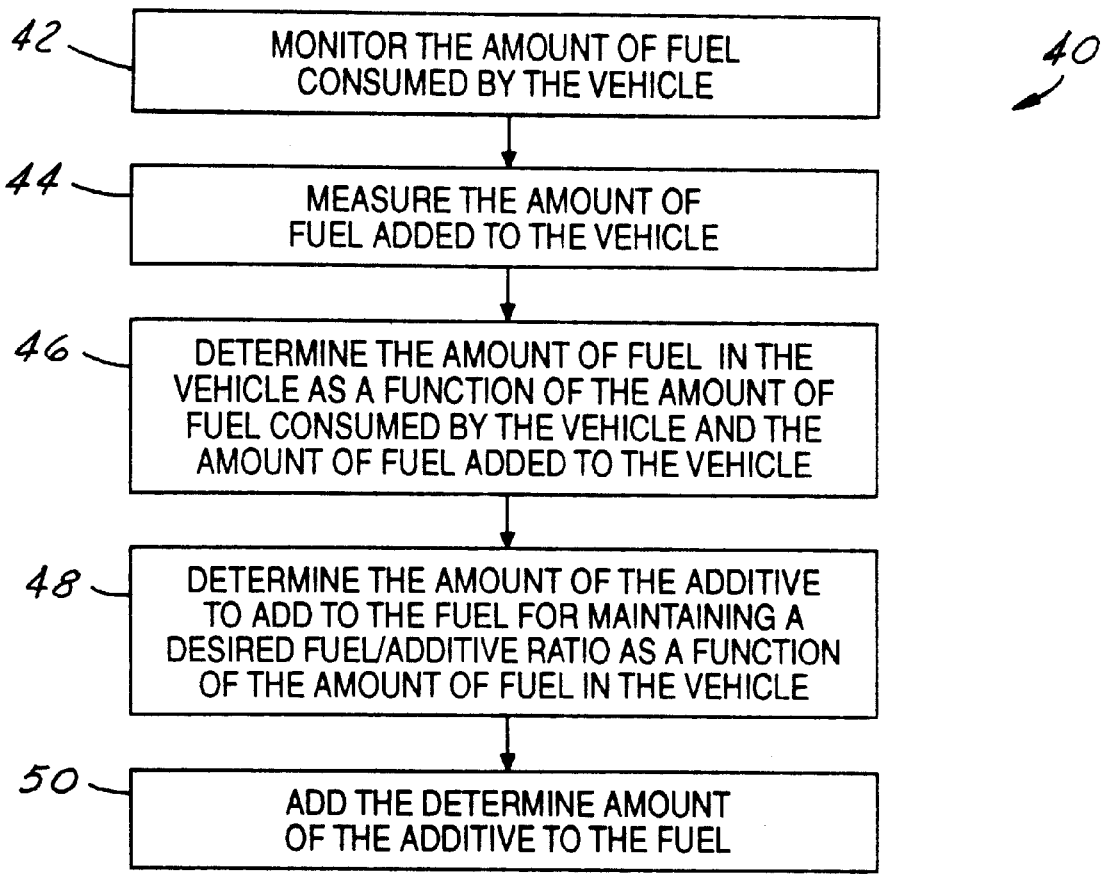
FIG. 5 illustrates a flowchart describing operation of the fuel additive dosing method and system of the present invention.

Referring to FIG. 4 with continual reference to FIG. 1, measuring means 22 may include a fuel pump 32 capable of transmitting a signal to the vehicle indicative of the amount of fuel added to fuel tank 14. Fuel pump 32 includes a transmitter 36 for transmitting the signal indicative of the amount of fuel added to fuel tank 28 during refueling to a receiver of processor 18 in the vehicle. The signal may be transmitted along an electromagnetic path, a direct electrical path from fuel tank 34 to processor 18, and the like. An operator of the vehicle may also view display 38 of fuel pump 34 and manually enter into processor 18 the amount of fuel dispensed by the fuel pump into fuel tank 14.

Referring now back to FIG. 1, processor 18 is operable with ECU 20 and measuring means 22 for determining the amount of fuel in fuel tank 14 after refueling. To determine the amount of fuel in fuel tank 14, processor 18 compares the amount of fuel consumed by the vehicle prior to refueling as determined by ECU 20 with the amount of fuel added to the fuel tank during refueling as determined by measuring means 22. Based on the amount of fuel added to fuel tank 14 by refueling, processor 18 is determines an amount of the additive to add to the fuel tank to maintain a desired fuel/additive ratio. Processor 18 controls dispenser 24 to add the determined amount of the additive from additive tank 16 into fuel tank 14 after refueling.

Referring now back to FIG. 1, processor 18 is operable with ECU 20 and measuring means 22 for determining the amount of fuel in fuel tank 14 after refueling. To determine the amount of fuel in fuel tank 14, processor 18 compares the amount of fuel consumed by the vehicle prior to refueling as determined by ECU 20 with the amount of fuel added to the fuel tank during refueling as determined by measuring means 22. Based on the amount of fuel added to fuel tank 14 by refueling, processor 18 determines an amount of the additive to add to the fuel tank to maintain a desired fuel/additive ratio. Processor 18 controls dispenser 24 to add the determined amount of the additive from additive tank 16 into fuel tank 14 after refueling.

Box 46 then determines the amount of fuel in the vehicle after refueling as a function of the amount of fuel consumed by the vehicle prior to refueling and the amount of fuel added to the vehicle during refueling. Box 48 then determines the amount of the additive to add to the fuel in the vehicle for maintaining a desired fuel/additive ratio. The amount of the additive to add for maintaining a desired fuel/additive ratio is determined as a function of the amount of fuel added to the vehicle by refueling. Box 50 then adds the determined amount of the additive to the fuel in the vehicle.

Monitoring the amount of fuel consumed by the vehicle as provided for in box 42 in combination with directly measuring the fuel added to the vehicle as provided for in box 44 is an accurate way to determine the fuel in the vehicle as provided for in box 46. The monitoring and direct measuring steps provided for in boxes 42 and 44 can replace standard fuel gauges for driver information. Directly measuring the fuel added to the vehicle as provided for in box 44 in combination with the determination of the desired amount of additive to add to the fuel as provided for in boxes 48 and 50 provide higher accuracy than current on board dosing systems based on fuel gauge signals.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for adding an additive to fuel in a fuel tank of a vehicle, the method comprising:

measuring the amount of fuel added to the fuel tank of the vehicle during refueling irrespective of the amount of fuel in the fuel tank of the vehicle prior to refueling using a turbine; and determining the amount of the additive to add to the fuel in the fuel tank of the vehicle to maintain a desired fuel/additive ratio as a function of the measured amount of fuel added to the fuel tank of the vehicle by refueling.

2. The method of claim 1 further comprising:

adding the determined amount of the additive to the fuel in the fuel tank of the vehicle.

3. A system for adding an additive to fuel in a vehicle having a fuel tank, the system comprising:

a turbine positioned in the fuel tank inlet for measuring the amount of fuel added to the fuel tank of the vehicle during refueling irrespective of the amount of fuel in the fuel tank prior to refueling; and a processor operable with the turbine for determining an amount of the additive to add to the fuel in the fuel tank as a function of the measured amount of fuel added to the fuel tank to maintain a desired fuel/additive ratio.

4. The system of claim 3 further comprising:

a dispenser operable with the processor for adding the determined amount of the additive to the fuel tank of the vehicle.

5. A system for adding an additive to fuel in a vehicle having a fuel tank, the system for use with a fuel pump, the system comprising:

a venturi positioned in the fuel tank inlet for measuring the amount of fuel added from the fuel pump into the fuel tank irrespective of the amount of fuel in the fuel tank of the vehicle; and a processor operable with the venturi for determining an amount of the additive to add to the fuel in the fuel tank as a function of the measured amount of fuel added to the fuel tank to maintain a desired fuel/additive ratio.

6. The system of claim 5 further comprising:

a dispenser operable with the processor for adding the determined amount of the additive to the fuel tank.

* * * * *